United States Patent
Sano

(10) Patent No.: US 6,474,453 B2
(45) Date of Patent: Nov. 5, 2002

(54) DISC BRAKE, DISC BRAKE PAD, AND BACK PLATE FOR THE DISC BRAKE PAD

(75) Inventor: Yoshinori Sano, Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/730,982

(22) Filed: Dec. 6, 2000

(65) Prior Publication Data

US 2001/0003321 A1 Jun. 14, 2001

(30) Foreign Application Priority Data

Dec. 14, 1999 (JP) .......................... 11-353860

(51) Int. Cl.⁷ .......................... F16D 69/00; F16D 63/10
(52) U.S. Cl. .......................... 188/251 A; 188/218 XL
(58) Field of Search .......................... 188/251 A, 251 R, 188/218 XL

(56) References Cited

U.S. PATENT DOCUMENTS

| | | | |
|---|---|---|---|
| 4,173,681 A | * 11/1979 | Durrieu et al. | 188/251 A |
| 4,948,662 A | * 8/1990 | Simpson et al. | 428/374 |
| 5,198,282 A | * 3/1993 | Baker et al. | 428/375 |
| 5,984,055 A | * 11/1999 | Strasser et al. | 188/251 A |
| 6,260,674 B1 | * 7/2001 | Arai | 188/251 A |

FOREIGN PATENT DOCUMENTS

| | | | | |
|---|---|---|---|---|
| JP | 48-83264 | | 11/1973 | |
| JP | 57-124134 | | 8/1982 | |
| JP | 57-1834 A | * | 1/1992 | 188/73.1 |
| JP | 4-248030 A | * | 9/1992 | 188/251 R |
| JP | 5-180251 A | * | 7/1993 | 188/251 A |
| JP | 7-280006 A | * | 10/1995 | |
| JP | 8-170668 A | * | 7/1996 | |

* cited by examiner

*Primary Examiner*—Jack Lavinder
*Assistant Examiner*—Thomas J. Williams
(74) *Attorney, Agent, or Firm*—Muramatsu & Associates

(57) ABSTRACT

A disc brake having a higher friction coefficient and heat-resistance and is formed with a disc rotor made of an aluminum alloy and a disc brake pad having a back plate. The back plate for the brake pad is molded from heat-resistant short fibers and a heat-resistant resin. For the heat-resistant short fibers, glass fibers having a length of 10 mm or less are used, and are incorporated at 50 wt. % or more to secure the strength. The heat-resistant resin is made of organic polymer and is mixed with the short fibers in a substantially power form.

4 Claims, 2 Drawing Sheets

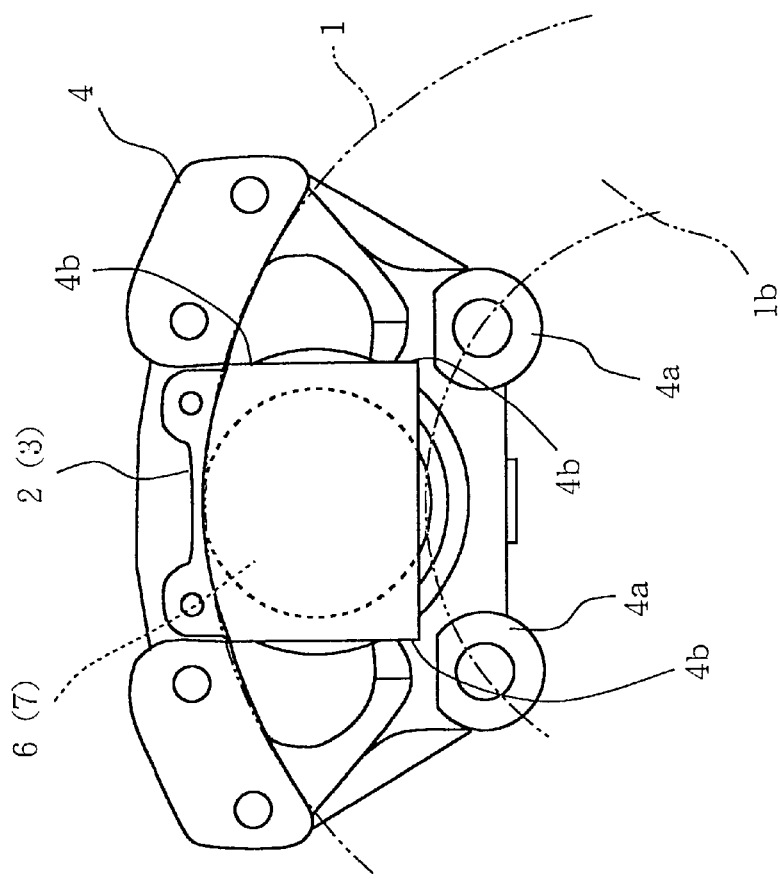
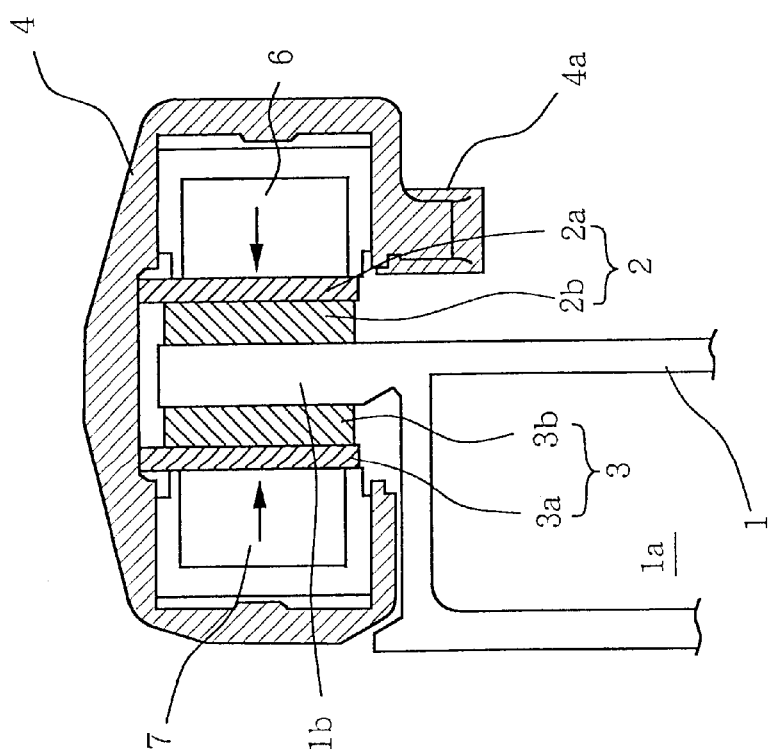

FIG.2a
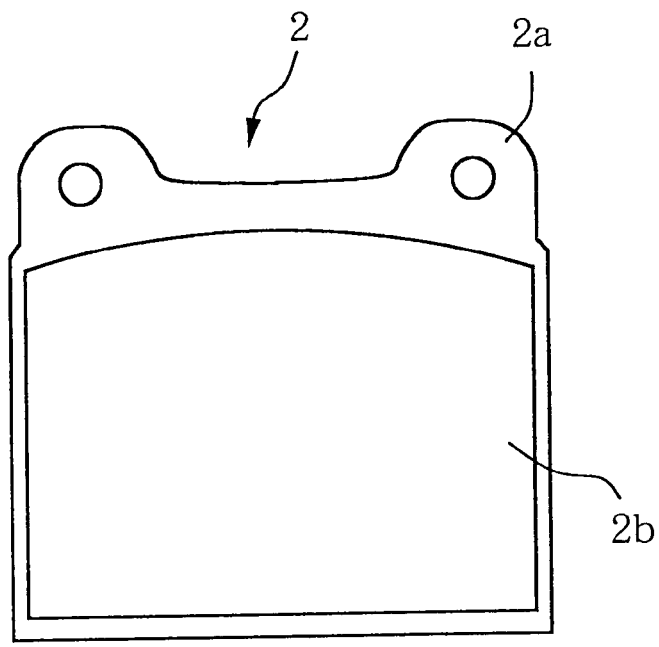
FIG.2c
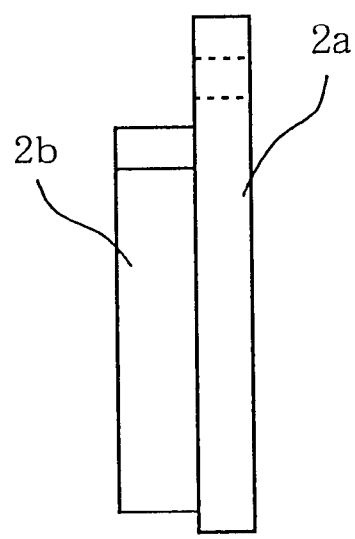
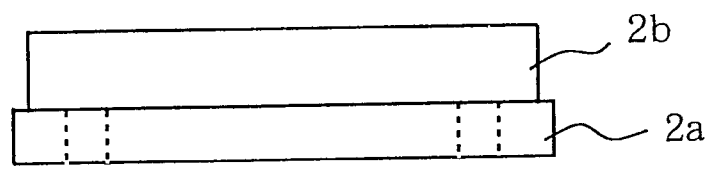
FIG.2b

DISC BRAKE, DISC BRAKE PAD, AND BACK PLATE FOR THE DISC BRAKE PAD

BACKGROUND OF THE INVENTION

1. Field of the Invention

The present invention relates to a disc brake which includes a disc rotor formed from an aluminum alloy and hardened with a ceramic reinforcing material and a component such as a disc brake pad having a back plate which is made of heat-resistant resin and heat-resistant short fibers.

2. Description of the Related Art

In Japan Patent Laid-Open Pub. No. S48-83264, a back plate is disclosed which is made of a synthetic resin. This back plate is made of a synthetic resin, so that it is light, and also it has heat resistance. Thus, attention has been paid to it from early time.

When a brake is operated, kinetic energy of an automobile is converted into friction heat, so that the temperature of a disc rotor is elevated up to 670K or higher. The heat conducts to a back plate via a friction material, so that the temperature of the back plate itself becomes considerably high. Therefore, the heat resistance of the back plate was not sufficient.

Braking is carried out repeatedly with irregular intervals. A friction material of a brake and a back plate are repeatedly exposed to a temperature cycle, so that there was such a problem that deterioration such as crack of material can be generated and the material can have insufficient strength. In addition, in case the difference between a linear expansion coefficient of a friction material and that of a back plate is large, a crack could be generated on an adhesive plane between them.

Therefore, in Japan Patent Laid-Open Pub. No. S57-124134, a back plate is proposed which is prepared by incorporating short fibers such as carbon fibers and glass fibers into a resin back plate and incorporating a continuous fiber prepreg into the center and both ends of the back plate for reinforcement.

It was difficult and not practical, however, to actually produce a back plate having such structure, especially to incorporate continuous fibers which were formed strings. In addition, the composition of a back plate did not become even, and filling fibers to the outer part was insufficient, so that the strength was insufficient.

On the other hand, in recent automobile industry, improvement of fuel performance is strongly advocated. Therefore, in order to lighten a vehicle, use of a disc rotor formed from an aluminum alloy and hardened with a ceramic reinforcing material (here in after "an aluminum alloy disc rotor") has been considered for a disc rotor which has been made of steel.

If an aluminum alloy disc rotor is used instead of a steel rotor, a coefficient of friction of the disc brake pad is lowered, so that the brake may work less effectively. Therefore, such a countermeasure has been taken that addition of an abrasive such as alumina to the friction material has been increased. If the amount of abrasive is enhanced, a coefficient of friction increases, so that the brake may work more effectively.

However, if a friction material having a higher coefficient of friction is used for an aluminum alloy disc rotor, loading of the back plate increases, and the back plate tends to be heated, so that it was difficult to secure strength.

SUMMARY OF THE INVENTION

The present invention was conceived in order to solve such a problem. It is therefore the object of the present invention to provide a disc brake using an aluminum alloy disc rotor which allows lightening of a brake, has heat resistance, and gives sufficient strength, a disc brake pad for the same, and a back plate used for the disc brake pad.

In order to achieve the above object, according to a first aspect of the present invention there is provided a disc brake which has a disc rotor made of an aluminum alloy and hardened with a ceramic reinforcing material and a disc brake pad which is provided so as to be able to connect and disconnect the rotor, wherein the disc brake pad has a back plate which is made of a heat-resistant resin of organic polymer in which heat-resistant short fibers are incorporated.

To attain the above object, according to a second aspect of the present invention there is provided a disc brake pad which is used for an aluminum alloy disc rotor, wherein the disc brake pad has a back plate which is made of a heat-resistant resin of organic polymer in which heat-resistant short fibers are incorporated.

Preferably, the disc brake pad is prepared by bonding a non-asbestos-based friction material which contains a non-asbestos nonmetallic heat-resistant fiber component, a filler, and a heat-resistant resin, to the back plate.

In order to achieve the above object, according to a third aspect of the present invention there is provided a back plate for a disc brake pad which is used for a disc rotor made of an aluminum alloy, wherein the back plate contains heat-resistant short fibers and an organic polymer based heat-resistant resin.

Preferably, the back plate contains heat-resistant short fibers at 50 wt. % or more, and the heat-resistant short fibers are glass fibers.

The heat-resistant short fibers may have a length of 10 mm or less.

The back plate may have a shrinkage percentage of 0.15% or less upon a heat treatment, and a difference between a shrinkage percentage of the back plate and that of said friction material which is bonded to the back plate is 0.1% or less.

The back plate for a disc brake pad of the present invention is particularly suitable for a brake in a small-sized vehicles or ordinary passengers vehicles with regenerative brake or for a rear brake in ordinary passenger vehicles having a relatively small braking load.

BRIEF DESCRIPTION OF THE DRAWINGS

The above and other objects, aspects, features and advantages of the present invention will become more apparent from the following detailed description when read in conjunction with the accompanying drawings, in which:

FIG. 1a and FIG. 1b illustrate the main part of a disc brake where FIG. 1a is a longitudinal sectional view and FIG. 1b is a front view of the disc brake corresponding to FIG. 1a; and FIG. 2a and FIG. 2b illustrate a disc brake pad 2 in accordance with the present invention, in front view in FIG. 2a, in bottom view in FIG. 2b and in side view in FIG. 2c.

DESCRIPTION OF THE PREFERRED EMBODIMENT

An embodiment of the present invention will now be described.

FIG. 1 illustrates the main part of a disc brake according to the present invention. FIG. 1a illustrates its longitudinal cross-sectional view. FIG. 1b illustrates its front view. Disc rotor 1 rotates together with a wheel of an automobile. The right side of FIG. 1a is the body side (inside). The left side of FIG. 1a is the outside. Disc rotor 1 has cylindrical hollow part 1a in its central part, and plane flange part 1b in its peripheral part. Disc brake pads 2 and 3 which are placed on both sides of flange part 1b press the flange part 1b to cause the brake torque. In cylindrical hollow part 1a, a drum brake for a parking brake is housed (not illustrated).

FIG. 2 illustrates disc brake pad 2 according to the present invention. FIG. 2a illustrates its front view. FIG. 2b illustrates its bottom view. FIG. 2c illustrates its side view. As illustrated in those figures, disc brake pad 2 is prepared by bonding friction material 2b to synthetic resin back plate 2a, and is held substantially in the center of caliper 4. Inner piston 6 and outer piston 7 which are provided in caliper 4 are pressed against back plates 2a and 3a, respectively, with springs and the like (not illustrated). Caliper 4 has fixing part 4a to insert a bolt to be fixed to a fixing part of a vehicle (not illustrated).

Inner piston 6 and outer piston 7 are ordinarily driven by oil pressure and so on. Stepping a brake pedal allows simultaneous operation of both inner piton 6 and outer piston 7 to move disc brake pads 2 and 3 to the direction of the arrow to press them onto both sides of rotating disc rotor 1. Disc brake pads 2 and 3 are about to rotate together with disc rotor 1. However, disc brake pads 2 and 3 contact with torque-receiving parts 4b which was formed in several sites of caliper 4, and caliper 4 is fixed at fixing part 4a, so that disc brake pads 2 and 3 can not rotate, and the rotation of the disc rotor is braked. Ultimately, all the brake torque which is applied to disc rotor 1 is received by caliper 4

A friction material having a high coefficient of friction for combination with an aluminum alloy disc rotor is prepared and tested using a synthetic resin as a back plate. As a result, the temperature of the disc rotor can be maintained at 670K or lower, and it is confirmed that there is no actual problem when the synthetic resin back plate of this invention is used in vehicles.

The back plate according to the present invention is prepared as follows. Heat-resistant fibers, which have strength and do not melt at the temperature where a matrix resin (heat-resistant resin) melts, are used for incorporating into a raw material. Fibers which satisfy such conditions include glass fibers, carbon fibers, metallic fibers, and aramid fibers. In case where severe adiabaticity is required, non-metallic fibers are preferably used. In addition, it is preferable that the fibers have a length of 10 mm or less so that the fibers can be homogeneously mixed with raw material powder to allow compression or extrusion molding. There is no limitation with respect to fiber diameter. Chopped strands can also be used.

Both thermoplastic and thermocurable resins can be used as the matrix resin (heat-resistant resin). In particular, phenolic resin, epoxy resin, unsaturated polyester resin, vinyl ester resin, diallyl phthalate resin, and polyimide resin are preferably used. In other words, the heat-resistant resin incorporated in the back plate is organic polymer based resin distinguishable from other type of resin such as ceramic resin.

A powder or granular resin into which short fibers are incorporated, or resin pellets into which fibers are incorporated, are used as raw materials. These raw materials can be handled substantially as powder, and can be charged into a metal mold to be compressed with a pressing machine and be heated to mold a back plate having a desired form. The raw material can also be heated and melted to extrude into a metal mold or extrude for molding.

According to the method, a back plate having any form can be molded, and fibers are evenly distributed throughout the back plate, so that an excellent back plate having even strength can be obtained.

Onto a back plate thus formed, a friction material is bonded to give a disc brake pad. Bonding was carried out in the following manner, for example, in the case of compression molding using a pressing machine. A back plate which was molded as described above is set on an under metal mold of a pressing machine, and a frame is placed on the back plate, and raw material powder for the friction material is charged into the frame. The frame is a cylinder having openings in top and bottom, so that the raw material is directly mounted on the back plate. Then, an upper metal mold is inserted from the frame to compress and heat the raw material powder to mold and bond to the back plate. In case a raw material for the friction material is charged into the frame, the raw material powder can be first charged as an adhesive, and the raw material for the friction material can be charged onto it.

A non-asbestos-based friction material is used which contains a fiber component other than asbestos, a filler, and a heat-resistant resin (organic polymer based resin), and contains as little metallic component as possible in order to lower thermal conductivity. In addition, a ceramic-based abrasive is incorporated into the material at a concentration necessary to secure a sufficient coefficient of friction against an aluminum alloy. The friction material can be molded by compression, injection, or extrusion.

Then heat treatment is carried out in order to promote the hardening of the organic polymer based heat-resistant resin and curing of the heat-resistant resin as a material for friction material and back plate. The heat treatment comprises the steps of heating at 420–440K for 1–3 hours and then heating at 460–490K for 4–8 hours. This heat treatment causes shrinking of the friction material while the back plate involves only a small shrinkage percentage, thus, the disc brake pad after the heat treatment does not have noticeable warp.

In the case of extrusion molding or injection molding, a back plate and a friction material are separately molded and then bonded each other with an adhesive. Also in the case of compression molding using the pressing machine, a back plate and a friction material can be separately molded and then bonded each other. The heat treatment in these cases can be carried out separately before a back plate and a friction material are bonded each other, or after a back plate and a friction material are bonded each other as in the case of molding using a pressing machine.

The disc brake pad according to the present invention has such a property that a coefficient of linear thermal expansion of the friction material and that of the back plate can be controlled at a comparable level. Therefore, even if a brake pad that has been produced by bonding is pressed onto a rotor many times by braking operations and receives thermal cycle comprising high temperature and low temperature, warp is seldom occurred.

For a disc rotor onto which a friction material is pressed, an aluminum alloy is used as described above. Although an aluminum alloy disc rotor is light, it does not have sufficient heat resistance. A cast iron disc rotor can be used at 770–870K without any problem, while an aluminum alloy disc rotor must be used at 670K or lower to prevent rapid wear of the disc rotor.

The temperature during use could be controlled at 670K or lower by using a disc brake which was prepared by bonding the back plate with a friction material pad in combination with an aluminum alloy disc rotor according to the present invention.

The present invention is described in more detail by the following example.

EXAMPLE

Phenolic resin powder was used as the matrix resin for the back plate. Glass fibers having a length of 10 mm or less were incorporated as heat-resistant fibers at 50 wt. % in order to secure the strength which is required for the back plate, thereby preparing the raw material powder.

The obtained powder was charged into a metal mold of a pressing machine, and a temperature of the metal mold was kept at 430K, and a pressure of 34.3 MPa was applied for 180 sec to mold a back plate.

The back plate which was thus obtained was set in an under metal mold of a pressing machine, and a frame was placed on the back plate, and the raw material powder for a friction material is charged, and the material was pressed and heated with an upper metal mold, and the friction material was bonded to the disc brake pad.

A non-asbestos-based friction material was prepared as follows. 10 pts. wt. of aramid fibers, 30 pts. wt. of brass, 12 pts. wt. of graphite, 10 pts. wt. of a friction modifier, 16 pts. wt. of barium sulfate, 5 pts. wt. of calcium carbonate, 12 pts. wt. of silicon carbide, and 10 pts. wt. of a phenolic resin were blended to form friction material powder, and the obtained powder was heat- and pressure-molded using a pressing machine to produce a disc brake pad, which was heated at 440K for 3 hours, and then heated at 470K for 5 hours. Both the width of the friction material and that of the back plate were measured before and after the heat treatment, and a shrinkage percentage was determined according to the following equation:

[Shrinkage percentage=(Size after heat treatment−Size before heat treatment)/Size before heat treatment]×100%

A shrinkage percentage of the friction material was—0.07%, and that of back plate was—0.13%. Thus, the difference between them was 0.06%.

The obtained disc brake pads were installed in disc brakes in which aluminum alloy disc rotors are used which were installed in rear wheels of a 1500 ml class passenger car for testing.

The automobile was driven at a speed of 100 km/h, and was rapidly braked. This test was repeated, and the maximal temperature of the disc rotor was determined to be 540K, wherein the maximal temperature is a temperature before 15th braking in the second fade test according to JASO C402-88.

The reasons why such a result was obtained are considered as follows.
1) An aluminum alloy disc rotor has good heat conductivity and heat radiation property, so that the temperature of the rotor is not elevated much under the same loading.
2) The tested automobile was small-sized, and the disc brakes were installed as rear brakes, so that the load was rather small among real automobile conditions.

The combination of the aluminum alloy disc rotor and the synthetic resin back plate according to the present invention is more effective when used in a vehicle with the regenerative brake, i.e., because when used in a vehicle which has the regenerative brake mechanism, the elevation of the temperature becomes small. The reason for this phenomenon is considered as follows. The heat load to the disc brakes is reduced by the regenerative brake mechanism, and an effect similar to lightening is demonstrated.

The above reasons made it possible to use an aluminum alloy disc rotor and a synthetic resin back plate under a condition in which the temperature is not elevated over 670K upon braking.

As described above for a disc brake pad which is used in an aluminum alloy disc rotor, a back plate is used which consists of a material containing heat-resistant short fibers and a heat-resistant resin, so that the present invention makes it possible to lighten a brake to contribute to the improvement of fuel performance of an automobile.

In addition, lightening the back plate promotes damming effects of oscillation and can prevent grating upon braking. In addition, the back plate does not rust, so that painting became unnecessary. The fibers to be incorporated are short, so that they can be evenly distributed in the back plate, and can secure evenness of the back plate.

By controlling the length of the heat-resistant short fibers at 10 mm or less, the back plate can be molded by compression molding using a pressing machine, by injection molding using an extruder, or by extrusion molding, i.e., the back plate can be easily mass produced.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A disc brake pad for use with an aluminum alloy disc rotor, comprising:

a back plate made of material which is a mixture of a heat-resistant resin of organic polymer and heat-resistant short fibers through heat mold;

wherein said disc brake pad is produced by bonding a non-asbestos-based friction material which contains a non-asbestos non-metallic heat-resistant fiber component, a filler, and a heat-resistant resin, to said back plate; and wherein said back plate has a shrinkage percentage of 0.15% or less upon a heat treatment, and a difference between a shrinkage percentage of said back plate and that of said friction material which is bonded to the back plate is 0.1% or less.

2. A back plate for a disc brake pad according to claim 1, wherein said back plate contains heat-resistant short fibers at 50 wt. % or more, and said heat-resistant short fibers are glass fibers.

3. A back plate for a disc brake pad according to claim 1, wherein said heat-resistant short fibers in said back plate have a length of 10 mm or less.

4. A back plate for a disc brake pad according to claim 1, wherein said back plate is used for a brake in a small-sized vehicle or ordinary passenger vehicles with regenerative brake or for a rear brake in passenger vehicles.

\* \* \* \* \*